(12) United States Patent
Eguchi et al.

(10) Patent No.: US 8,002,246 B2
(45) Date of Patent: Aug. 23, 2011

(54) AERATION APPARATUS

(75) Inventors: Toshihiko Eguchi, Fukuoka (JP);
Kazumi Kawashima, Fukuoka (JP)

(73) Assignees: Aura Tec Co., Ltd., Fukuoka (JP);
Kawashima Seisakusho Co., Ltd.,
Fukuoka (JP)

( * ) Notice: Subject to any disclaimer, the term of this patent is extended or adjusted under 35 U.S.C. 154(b) by 166 days.

(21) Appl. No.: 12/446,484

(22) PCT Filed: Oct. 25, 2007

(86) PCT No.: PCT/JP2007/070783
§ 371 (c)(1),
(2), (4) Date: Jul. 31, 2009

(87) PCT Pub. No.: WO2008/050826
PCT Pub. Date: May 2, 2008

(65) Prior Publication Data
US 2010/0295192 A1    Nov. 25, 2010

(30) Foreign Application Priority Data

Oct. 27, 2006  (JP) ................. 2006-293199
Dec. 13, 2006  (JP) ................. 2006-336225

(51) Int. Cl.
*B01F 3/04* (2006.01)
(52) U.S. Cl. ...... 261/30; 210/221.2; 261/77; 261/119.1; 261/123
(58) Field of Classification Search .......... 261/77, 261/119.1, 120, 123, 28–30, 36.1; 210/220, 210/221.1, 221.2
See application file for complete search history.

(56) References Cited

U.S. PATENT DOCUMENTS

| | | | | |
|---|---|---|---|---|
| 2,790,506 | A * | 4/1957 | Van Vactor | 96/334 |
| 3,148,509 | A * | 9/1964 | Laurie | 405/22 |
| 3,653,641 | A | 4/1972 | Eron | |
| 3,855,367 | A * | 12/1974 | Webb | 261/77 |
| 3,968,086 | A * | 7/1976 | Romanowski | 261/77 |
| 4,210,613 | A | 7/1980 | Webb | |
| 4,226,719 | A | 10/1980 | Woltman | |
| 4,329,227 | A * | 5/1982 | Todd | 210/220 |
| 4,752,421 | A * | 6/1988 | Makino | 261/77 |
| 4,882,072 | A | 11/1989 | Eberhardt | |
| 4,911,838 | A * | 3/1990 | Tanaka | 210/221.2 |
| 5,755,976 | A * | 5/1998 | Kortmann | 210/747 |
| 5,783,118 | A * | 7/1998 | Kolaini | 261/37 |

(Continued)

FOREIGN PATENT DOCUMENTS

GB   2 243 151 A   10/1991

(Continued)

OTHER PUBLICATIONS

International Search Report mailed Jan. 29, 2008 for PCT/JP2007/070783 filed Oct. 25, 2007.

(Continued)

*Primary Examiner* — Richard L Chiesa
(74) *Attorney, Agent, or Firm* — Martin Fleit; Paul D. Bianco; Fleit Gibbons Gutman Bongini & Bianco PL

(57) ABSTRACT

The invention provides an aeration apparatus for injecting air into a target substance to aerate the target substance. The aeration apparatus is capable of keeping the air jet nozzle from contacting the target substance when the apparatus is stopped, so as to prevent clogging of the air jet nozzle.

8 Claims, 7 Drawing Sheets

U.S. PATENT DOCUMENTS

| | | | |
|---|---|---|---|
| 6,032,931 A * | 3/2000 | Plunkett | 261/77 |
| 2006/0145366 A1* | 7/2006 | Thomas | 261/79.2 |
| 2007/0182033 A1* | 8/2007 | Lipert | 261/77 |

FOREIGN PATENT DOCUMENTS

| | | |
|---|---|---|
| JP | 58-095293 | 6/1983 |
| JP | 05-060597 | 8/1993 |
| JP | 05-253593 A | 10/1993 |
| JP | 09-314169 A | 12/1997 |
| JP | 2001-269692 A | 10/2001 |
| JP | 2003-220396 A | 8/2003 |
| JP | 2006-198478 A | 8/2006 |
| JP | 2006-247586 A | 9/2006 |

OTHER PUBLICATIONS

International Preliminary Report on Patentability published Apr. 4, 2009 for PCT/JP2007/070783 filed Oct. 25, 2007.

English translation of International Preliminary Report on Patentability published Apr. 4, 2009 for PCT/JP2007/070783 filed Oct. 25, 2007.

Written Opinion of the International Searching Authority published Apr. 4, 2009 for PCT/JP2007/070783 filed Oct. 25, 2007.

English translation of the Written Opinion of the International Searching Authority published Apr. 4, 2009 for PCT/JP2007/070783 filed Oct. 25, 2007.

* cited by examiner

[Fig 1]
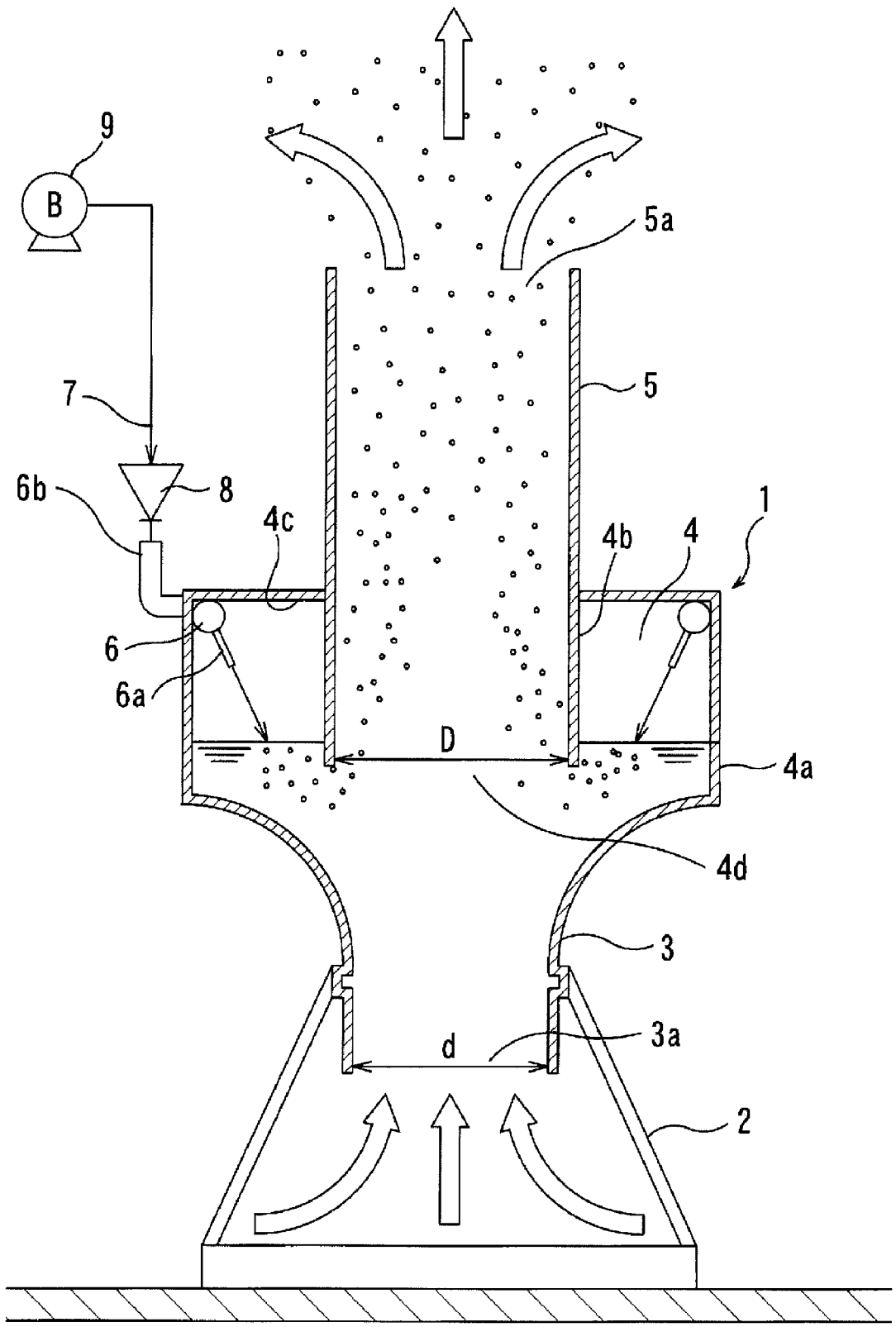

[Fig. 2]
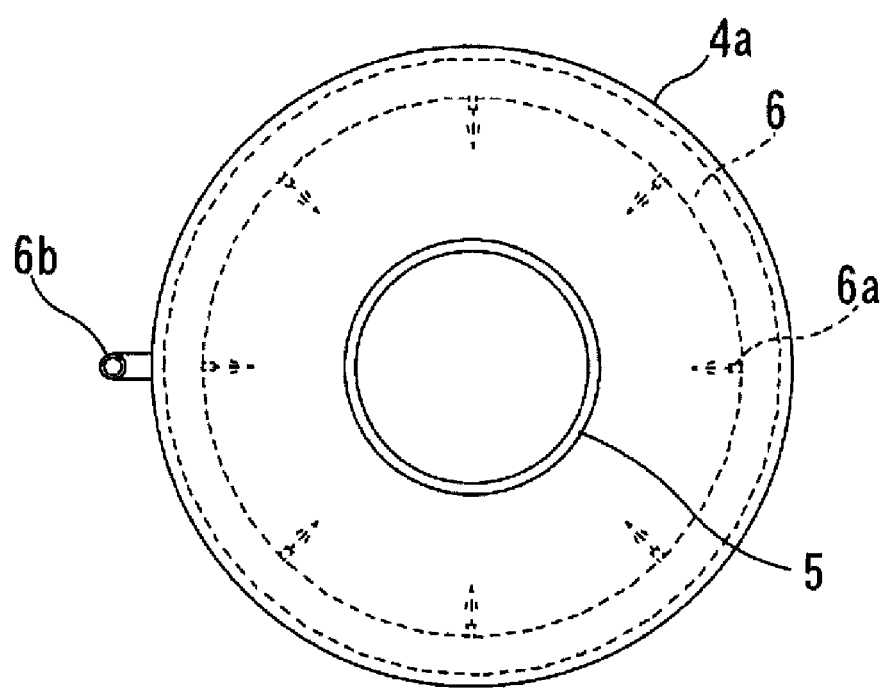

[Fig. 3]
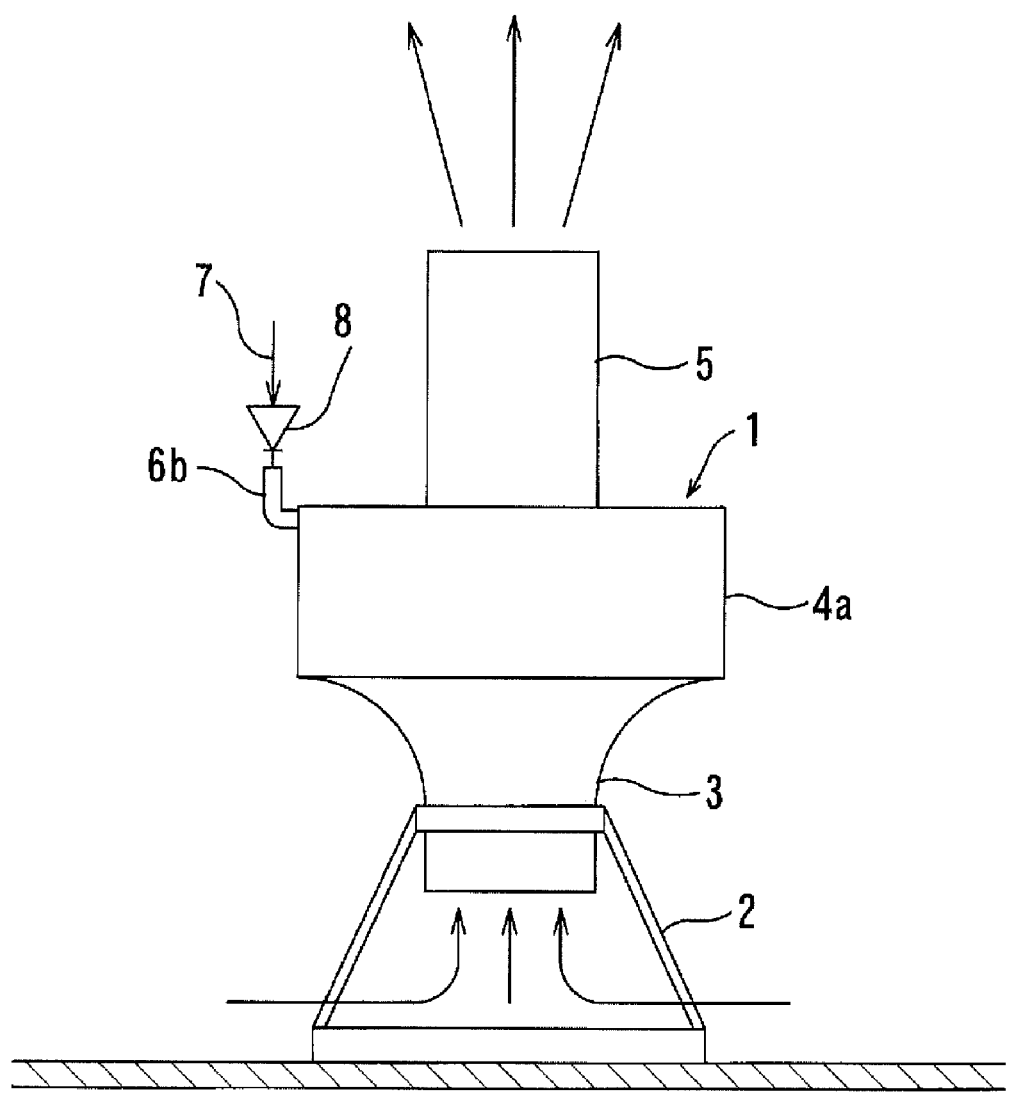

[Fig. 4]
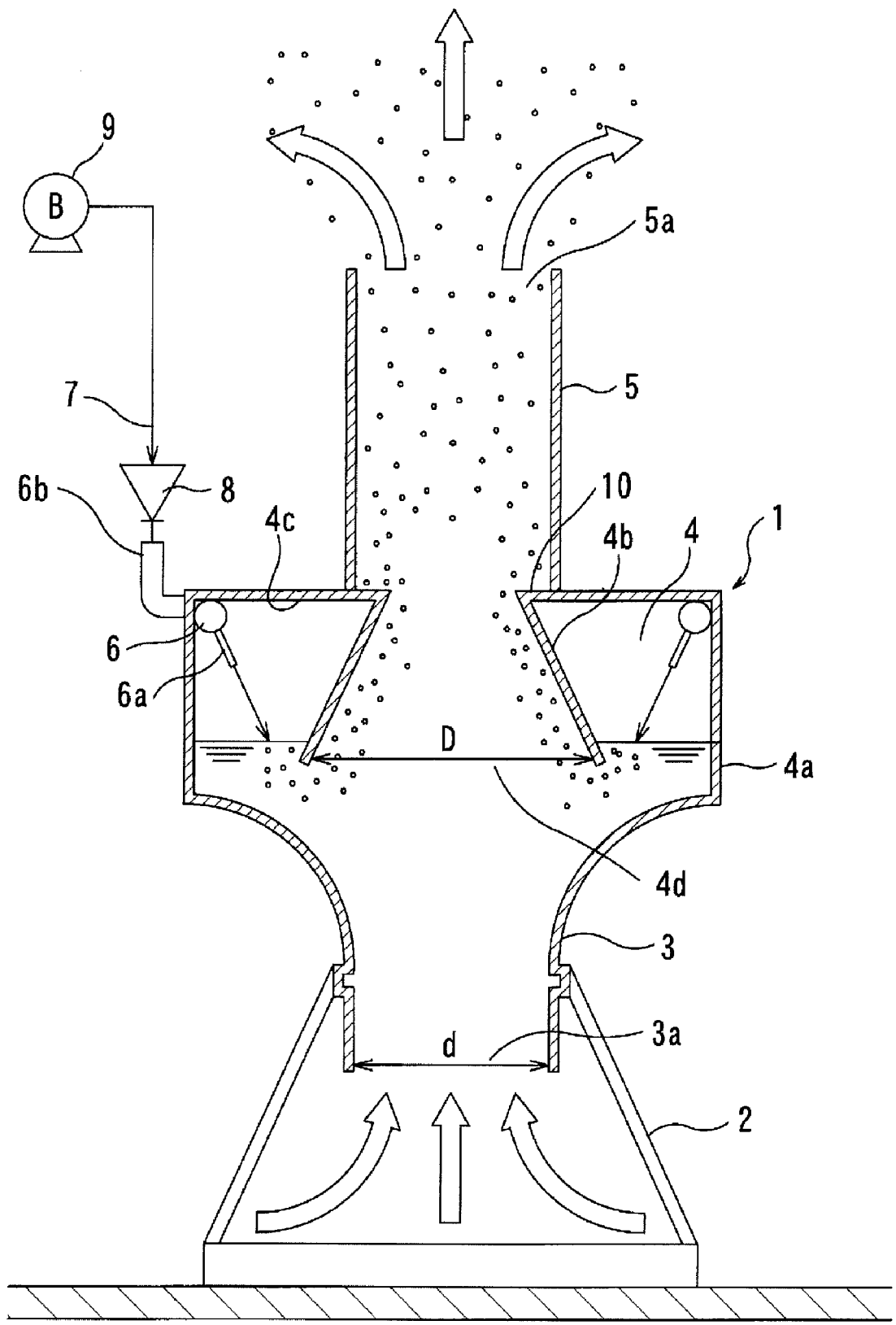

[Fig. 5]
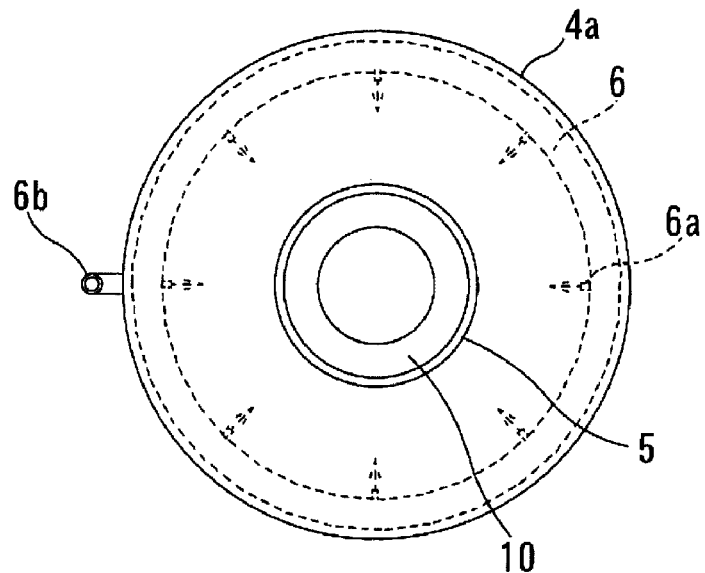
[Fig. 6]
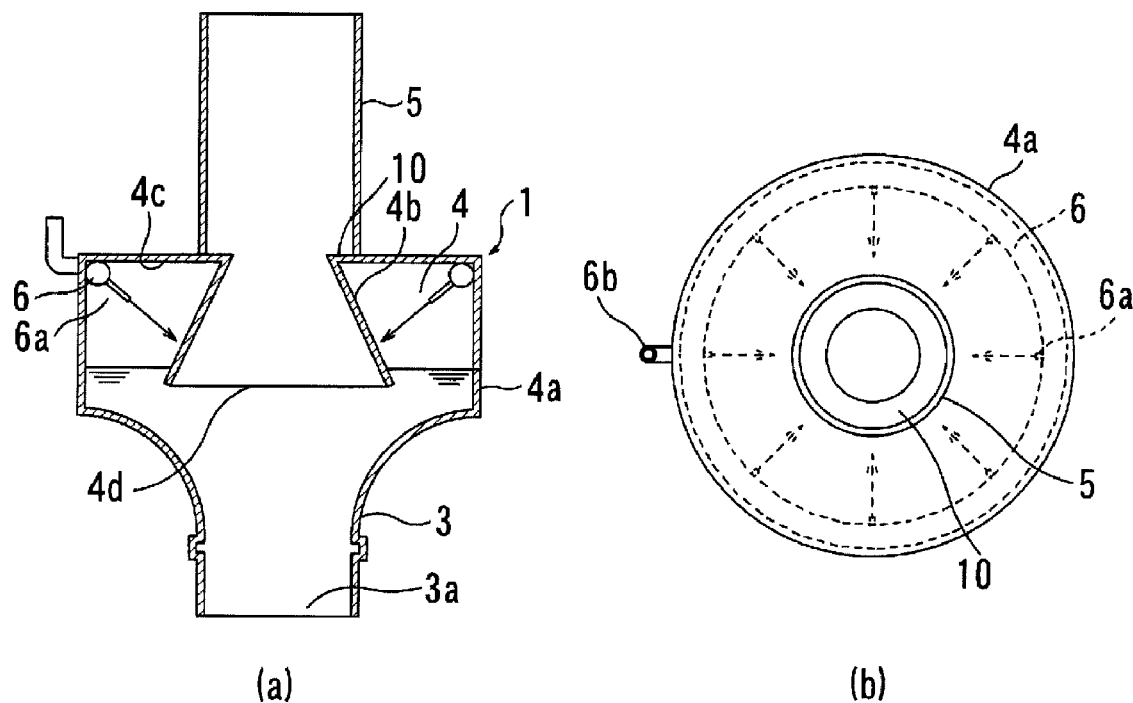
(a)                  (b)

[Fig. 7]
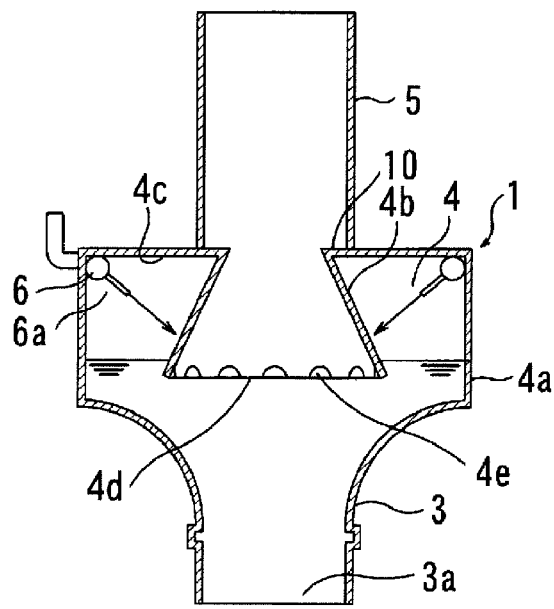
[Fig. 8]
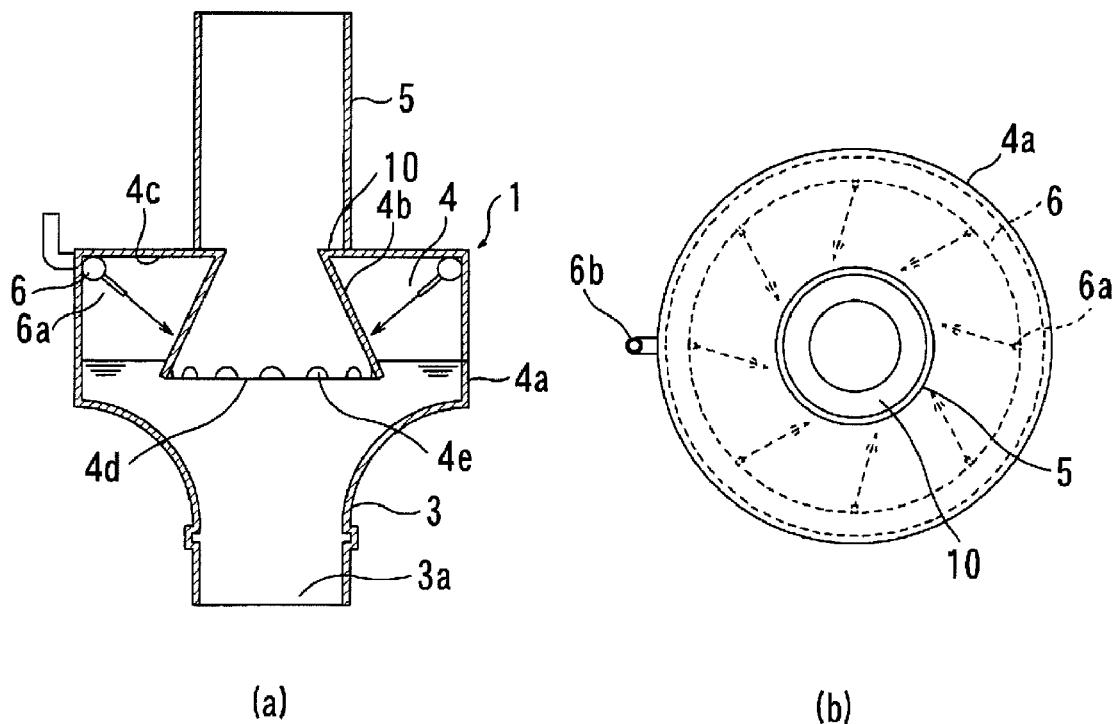
(a)　　　　　　　　　　(b)

[Fig. 9]
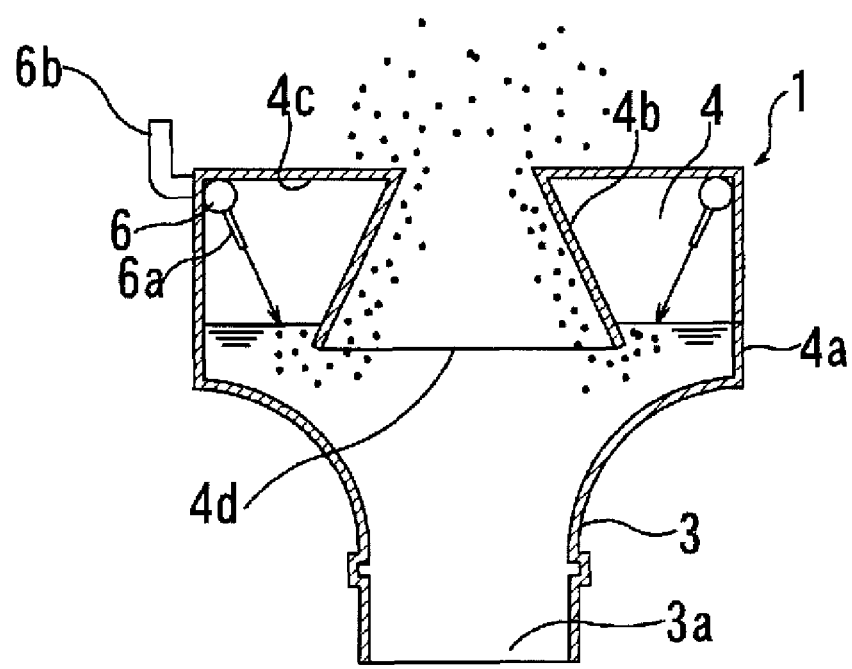

AERATION APPARATUS

CROSS REFERENCE TO RELATED APPLICATIONS

This application is the U.S. national stage of International Application No. PCT/JP2007/070783 filed on Oct. 25, 2007.

TECHNICAL FIELD

The present invention relates to an aeration apparatus for jetting air from an air jet hole to perform aeration, and more particularly to an aeration apparatus free from occurrence of clogging of an air jet hole even after it is stopped.

BACKGROUND ART

In faculties for treatments requiring oxygen, such as treatment facilities for animal waste, sludge and sewage, and purification facilities for pond water and boggy water, a diffuser tube-type aeration apparatus is used for jetting air from an air jet hole to perform aeration, wherein the aeration apparatus is operable, under a condition that it is installed in a bottom position of a treatment tank, to jet air from a diffusion tube of an air diffuser to generate air bubbles so as to supply oxygen to a target substance (substance to be treated), such as sewage, to aeration the target substance.

As one example of the diffuser tube-type aeration apparatus, the following Patent Document 1 discloses an aeration apparatus designed to intermittently aerate sewage in an aeration tank while continuously stirring the sewage, to alternately perform an aerobic treatment and an anaerobic treatment, wherein the aeration apparatus is operable, in the aerobic treatment, to jet air from a diffuser tube of an air diffuser to perform aeration, and, when an aerobic period has passed, to stop the aeration to shift to an anaerobic treatment in a next stage.

In regard to an air diffuser for use in an aeration apparatus, for example, a diffuser tube provided with an air jet nozzle is employed (see the following Patent Document 1 to 5).
[Patent Document 1] JP 2006-247586A
[Patent Document 2] JP 2006-198478A
[Patent Document 3] JP 2003-220396A
[Patent Document 4] JP 2001-269692A
[Patent Document 5] JP 9-314169A

DISCLOSURE OF THE INVENTION

Problem to be Solved by the Invention

In the aeration apparatuses disclosed in the above Patent Documents, there is a problem that an air jet nozzle is clogged with a target substance, such as animal waste, sludge or sewage, during a period where aeration is stopped, and thereby it becomes impossible to start the aeration immediately after the period. Moreover, if such clogging occurs, a lot of time and effort will be spent for an operation of clearing the clog (clog-clearing operation).

Therefore, the present invention is directed to providing an aeration apparatus capable of keeping an air jet nozzle from contacting a target substance during stop thereof, so as to prevent clogging of the air jet nozzle.

Means for Solving the Problem

The present invention provides an aeration apparatus for use under a condition that it is immersed in a target substance, to inject air into the target substance so as to aerate the target substance. The aeration apparatus comprises: a lower cylinder having an opening formed at a lower end thereof to allow the target substance to flow thereinto, wherein the lower cylinder is divergent upwardly from the opening; an air accumulator chamber formed based on a space surrounded by a ceiling portion, an outer cylinder provided above and in continuous relation to the lower cylinder, and an inner cylinder disposed inside the outer cylinder with a distance therebetween and formed to allow a lower end thereof to have a diameter greater than that of the opening of the lower cylinder, wherein the space is to be hermetically closed during stop of the aeration apparatus; an air jet device including an air delivery pipe disposed on the ceiling portion at a position inside the air accumulator chamber, wherein the air delivery pipe has a plurality of air jet nozzles adapted to jet air toward the target substance and arranged at intervals; and a compressed-air supply pipe connected to the air delivery pipe through a connecting pipe at a position outside the air accumulator chamber, to supply compressed air thereto.

In the aeration apparatus of the present invention, the air accumulator chamber is defined by the outer cylinder and the inner cylinder during stop of the aeration apparatus. Thus, during stop of the aeration apparatus, a rise in level of the target substance in the hermetically-closed air accumulator chamber is suppressed to keep each of the air jet nozzles disposed inside the air accumulator chamber from contacting the target substance. This makes it possible to prevent the air jet nozzle from being clogged with the target substance.

The aeration apparatus of the present invention has a simple structure based on an arrangement of the cylinders and the pipes, and a clogging-free structure eliminating a need for a clog-clearing operation, so that all initial, running and maintenance costs can be reduced.

Based on the capability to keep the air jet nozzle from contacting the target substance during stop of the apparatus, a hole diameter of the air jet nozzle can be reduced. As the hole diameter is reduced, an airflow volume becomes lower to facilitate a reduction in size of air bubbles, a reduction in level rise rate of the target substance, and an increase in retention time of the air bubbles. This makes it possible to improve dissolution efficiency of oxygen.

The compressed-air supply pipe may be provided with a check valve at a position adjacent to the connecting pipe of the air delivery pipe, to reduce a piping distance, so that a compression rate of air in the hermetically-closed air accumulator chamber during stop of the aeration apparatus can be reduced. This makes it possible to suppress a rise in level of the target substance in the air accumulator chamber so as to ensure a distance between the air jet nozzle and a surface of the target substance to prevent the occurrence of contact therebetween.

The lower cylinder is formed in a shape divergent upwardly from the opening at the lower end thereof, without a horizontal portion. This makes it possible to prevent deposition of a solid content of the target substance during stop of the aeration apparatus.

The inner cylinder of the air accumulator chamber is formed to allow a lower end thereof to have a diameter greater than that of the opening of the lower cylinder, or may be formed to be divergent downwardly from the upper end thereof to allow a lower end thereof to have a diameter greater than that of the opening of the lower cylinder. This makes it possible to restrain suspended solids from moving into and accumulating in the air accumulator chamber while concentrating in a mainstream of the target substance flowing upwardly from below the lower cylinder according to circulation.

An upper cylinder having an opening formed at an upper end thereof to allow the target substance to flow out therefrom may be provided in continuous relation to the inner cylinder of the air accumulator chamber, and further a connection region between the upper cylinder and the inner cylinder may have an annular-shaped stepped portion formed at a lower end of the upper cylinder. In this case, air bubbles moving upwardly will be finely segmented by turbulent flows at the stepped portion to provide enhanced efficiency in dissolution between the target substance and air.

An angle of the air jet nozzle may be set to allow air hit against the inner cylinder formed in a cross-sectionally circular shape to be directed downwardly, and may further be set to allow a jet direction of an air jet therefrom to be oriented in a tangential direction of the inner cylinder. This makes it possible to efficiently form an air swirl flow moving downwardly so as to allow for mixing of air in a more stable state.

Further, a plurality of cutouts may be formed in a lower edge of the inner cylinder at intervals to provide a plurality of air inlets each communicated with an inside of the inner cylinder. Thus, jetted air is moved downwardly while swirling along an outer peripheral surface of the inner cylinder, and then dispersedly guided to the inside of the inner cylinder through the air inlets. This makes it possible to obtain stable and fine air bubbles.

BRIEF DESCRIPTION OF DRAWINGS

FIG. 1 is a sectional view of an aeration apparatus according to a first embodiment of the present invention.

FIG. 2 is a top plan view of an aeration apparatus of the present invention.

FIG. 3 is a side view showing one example of installation of an aeration apparatus of the present invention.

FIG. 4 is a sectional view of an aeration apparatus according to a second embodiment of the present invention.

FIG. 5 is a top plan view of the aeration apparatus according to the second embodiment.

FIG. 6(a) is a sectional view showing a third embodiment of the present invention.

FIG. 6(b) is a top plan view of the third embodiment.

FIG. 7 is a sectional view showing a fourth embodiment of the present invention.

FIG. 8(a) is a sectional view showing a fifth embodiment of the present invention.

FIG. 8(b) is a top plan view of the fifth embodiment.

FIG. 9 is a sectional view showing a sixth embodiment of the present invention.

EXPLANATION OF CODES

1: aeration apparatus
2: support frame
3: lower cylinder
3a: opening
4: air accumulator chamber
4a: outer cylinder
4b: inner cylinder
4c: ceiling portion
4d: opening of inner cylinder
4e: air inlet
5: upper cylinder
5a: opening
6: air delivery pipe
6a: air jet nozzle
6b: connection pipe
7: compressed-air supply pipe
8: check valve
9: compressed-air generator
10: stepped portion

BEST MODE FOR CARRYING OUT THE INVENTION

The present invention will be described based on the drawings. FIG. 3 is a side view showing one example of installation of an aeration apparatus of the present invention.

An aeration apparatus of the present invention is adapted to be installed in a bottom region of a treatment tank for a target substance, such as animal waste, sludge or sewage, or in a bottom of pond water or lake water. The aeration apparatus 1 is supported by a support frame 2 in such a manner that a lower cylinder 3, an outer cylinder 4a for an air accumulator chamber, and an upper cylinder 5, are provided in continuous relation to each other in an upward direction while being communicated with each other.

The target substances flow into the lower cylinder 3 from a lower end thereof. In the air accumulator chamber 4, air is supplied through a compressed-air supply pipe 7, a check valve 8 and a connecting pipe 6b, and injected into a surface (level) of the target substance. Then, the target substance flows out from an upper portion of the upper cylinder 5, together with air bubbles generated therein. During stop of the aeration apparatus 1, the air accumulator chamber 4 is placed in a hermetically closed state by the check valve 8.

First Embodiment

FIG. 1 is a sectional view of an aeration apparatus according to a first embodiment of the present invention, and FIG. 2 is a top plan view of the aeration apparatus.

A lower cylinder 3 is formed in a shape divergent upwardly from an opening 3a of a lower end thereof, without a horizontal portion thereinside, so as to prevent deposition of a solid content in a target substance.

An air accumulator chamber 4 for accumulating air is formed based on a space surrounded by an outer cylinder 4a, and an inner cylinder 4b disposed inside the outer cylinder 4a with a distance therebetween. The outer cylinder 4a is provided above and in continuous relation to the lower cylinder 3, and the inner cylinder 4b is provided in continuous relation to an upper cylinder 5 in a direction toward the lower cylinder 3.

In order to supply oxygen to the target substance, an air jet device is provided to the air accumulator chamber 4 to jet compressed air into the air accumulator chamber to supply oxygen to the target substance. For example, an annular-shaped air delivery pipe 6 is disposed on a ceiling portion 4c at a position inside the air accumulator chamber. The air delivery pipe 6 is provided with a plurality of air jet nozzles 6a arranged at intervals. The air delivery pipe 6 is connected to an external compressed-air supply pipe 7 through a connecting pipe 6b. Each of the air jet nozzles 6a attached at an angle to allow compressed air to be injected into a surface (level) of the target substance located below the air accumulator chamber 4. Even if the aeration apparatus 1 is stopped, air is accumulated in the hermetically-closed air accumulator chamber 4 to suppress a rise in level of the target substance so as to prevent the air jet nozzles 6a from contacting the target substance.

The air jet device may be configured to jet compression air from the compressed-air supply pipe 7 directly into the air accumulator chamber 4, without disposing the air delivery pipe 6 with the air jet nozzles 6a inside the air accumulator chamber 4.

The connecting pipe 6b of the air delivery pipe 6 is connected to the external compressed-air supply pipe 7, and the external compressed-air supply pipe 7 is provided with a check valve 8 at a position adjacent to the connecting pipe 6b. The compressed-air supply pipe 7 has a base end connected with a compressed-air generator 9 for supplying compressed air to the air delivery pipe 6, such as a blower or a compressor. The check valve can prevent escape of air in the air accumulator chamber to stop a rise in level of the target substance located below the hermetically-closed air accumulator chamber 4 so as to keep the air jet nozzles 6a from contacting the target substance to prevent the air jet nozzles 6a from being clogged with the target substance. In case where a piping distance to the compressed-air generator 9 is relatively short, a compression rate of air in the air accumulator chamber is relatively low, and thereby the rise in level of the target substance can be suppressed without the check value.

A diameter D of a lower portion of the inner cylinder 4b is preferably set at a value greater than a diameter d of the opening 3a of the lower cylinder 3. During an operating state, suspended solids in the target substance flow into the lower cylinder 3 from the opening 3a at the lower end thereof, according to circulation. If such suspended solids enter into and deposit on the air accumulator chamber 4, clogging is likely to occur. The diameter D set to be greater than the diameter d allows the suspended solids to ride on a mainstream of the target substance moving upwardly so as to restrain the suspended solids from being directed toward the air accumulator chamber 4.

An operation of the aeration apparatus according to the first embodiment will be described below.

In FIG. 1, air sent by the compressed-air generator 9, such as a blower or a compressor, is introduced into the check value 8 attached at a position adjacent to the connecting pipe 6b and then into the air delivery pipe 6 located inside the air accumulator chamber 4, and injected from the air jet nozzles 6a into the surface of the target substance.

The air sent from the air jet nozzles 6a is accumulated in the air accumulator chamber 4 to suppress a rise in level of the target substance so as to prevent the air jet nozzles 6a from contacting the target substance.

Even during stop (non-operating state) of the aeration apparatus 1, the air accumulator chamber 4 is kept in a hermetically closed state by the check valve 8 to suppress the rise in level of the target substance, so that there is no risk of contact between each of the air jet nozzles 6a and the target substance, as with during the operating state.

The air jetted from the air jet nozzles 6a is injected into the surface of the target substance, and finely segmented. Then, the fine bubbles enter into the inner cylinder 4b from therebelow and move upwardly, whereafter the bubbles flow out from an opening 5a of the upper cylinder 5.

Second Embodiment

FIG. 4 is a sectional view showing a second embodiment of the present invention, and FIG. 5 is a top plan view of the aeration apparatus according to the second embodiment, wherein the same element or member as that in the first embodiment is defined by a common reference numeral or code.

An aeration apparatus 1 according to the second embodiment is supported by a support frame 2 in such a manner that a lower cylinder 3, an outer cylinder 4a for an air accumulator chamber, and an upper cylinder 5, are provided in continuous relation to each other in an upward direction while being communicated with each other, as with the first embodiment.

The lower cylinder 3 is formed in a shape divergent upwardly from an opening 3a of a lower end thereof, and the air accumulator chamber 4 for accumulating air is formed based on a space surrounded by an outer cylinder 4a, and an inner cylinder 4b disposed inside the outer cylinder 4a with a distance therebetween, as with the first embodiment. An annular-shaped air delivery pipe 6 provided with a plurality of air jet nozzles 6a is disposed on a ceiling portion 4c at a position inside the air accumulator chamber. A connecting pipe 6b of the air delivery pipe 6 is connected to an external compressed-air supply pipe 7, and the external compressed-air supply pipe 7 is provided with a check valve 8 at a position adjacent to the connecting pipe 6b. The compressed-air supply pipe 7 has a base end connected with a compressed-air generator 9 for supplying compressed air to the air delivery pipe 6, such as a blower or a compressor.

An inner cylinder 4b is provided in continuous relation to an upper cylinder 5 in a direction toward the lower cylinder 3, as with the first embodiment. In the second embodiment, a connection region between the upper cylinder 5 and the inner cylinder 4b has an annular-shaped stepped portion 10 formed at a lower end of the upper cylinder. Thus, turbulent flows are generated at the stepped portion 10 to allow air bubbles to be finely segmented, so as to provide enhanced efficiency in dissolution of oxygen into a target substance.

Further, in the second embodiment, the inner cylinder 4b is formed in a shape divergent downwardly to allow a diameter D of a lower portion of the inner cylinder 4b to be greater than a diameter d of the lower cylinder 2.

During an operating state, suspended solids in the target substance flow into the lower cylinder 3 from the opening 3a at the lower end thereof, according to circulation. If such suspended solids deposit on the air accumulator chamber 4, clogging is likely to occur. The diameter D set to be greater than the diameter d allows the suspended solids to ride on a mainstream of the target substance moving upwardly so as to restrain the suspended solids from flowing into the air accumulator chamber 4.

Third Embodiment

FIG. 6(a) is a sectional view showing a third embodiment of the present invention, and FIG. 6(b) is a top plan view of the third embodiment, wherein the same element or member as that in the second embodiment is defined by a common reference numeral or code. Except a jet direction of each of the air jet nozzles 6a, the third embodiment has the same structure and configuration as those in the second embodiment. Thus, a description about the same structure and configuration will be omitted.

In the third embodiment, as shown in FIG. 6, each of a plurality of air jet nozzles 6a is provided in an annular-shaped air delivery pipe 6 in such a manner that a jet direction of air jet therefrom is oriented toward an inner cylinder 4b having a circular shape in horizontal cross-section and being divergent downwardly. An air-jet angle of each of the air jet nozzles is set to allow air hit against the cross-sectionally circular-shaped inner cylinder to be directed downwardly.

In the third embodiment, air jetted from the air jet nozzles 6a is hit against the inner cylinder 4b, and moved downwardly while swirling along an outer peripheral surface of the inner cylinder 4b and spreading, whereafter the swirling air enters a target substance to form turbulent flows in an inside of the inner cylinder. This makes it possible to allow for mixing of air in a stable state.

The air-jet angle of each of the air jet nozzles 6a may be set to allow the jet direction to be oriented in a tangential direction of the cross-sectionally circular-shaped inner cylinder 4b. This makes it possible to efficiently form an air swirl flow moving downwardly so as to allow for mixing of air in a more stable state.

Fourth Embodiment

FIG. 7 is a sectional view showing a fourth embodiment of the present invention, wherein the same element or member as that in the third embodiment is defined by a common reference numeral or code. Except the jet direction of each of the air jet nozzles 6a, the third embodiment has the same structure and configuration as those in the second embodiment. Thus, a description about the same structure and configuration will be omitted.

In the fourth embodiment, as shown in FIG. 7, a plurality of cutouts are formed in a lower edge of an inner cylinder 4b defining an opening 4c, at intervals to provide a plurality of air inlets 4e each communicated with an inside of the inner cylinder 4b.

In the fourth embodiment, air jetted from a plurality of air jet nozzles 6a is hit against the inner cylinder 4b, and moved downwardly while swirling along an outer peripheral surface of the inner cylinder 4b, whereafter the swirling air is dispersedly guided to the inside of the inner cylinder 4b through the air inlets 4e. Thus, stable and fine air bubbles can be expelled from an opening 5a (see FIG. 5).

Fifth Embodiment

FIG. 8(a) is a sectional view showing a fifth embodiment of the present invention, and FIG. 8(b) is a top plan view of the fifth embodiment, wherein the same element or member as that in the fourth embodiment is defined by a common reference numeral or code.

In the fifth embodiment, an air-jet angle of each of a plurality of air jet nozzles 6a is set to allow a jet direction of air jet therefrom to be oriented in a tangential direction of a cross-sectionally circular-shaped inner cylinder 4b, and a plurality of cutouts are formed in a lower edge of the inner cylinder 4b defining an opening 4c, at intervals to provide a plurality of air inlets 4e each communicated with an inside of the inner cylinder 4b.

In the fifth embodiment, air is jetted in the tangential direction of the inner cylinder 4b to form a swirl flow, and then the swirl flow is dispersedly guided to the inside of the inner cylinder 4b through the air inlets 4e. This makes it possible to disperse stable and fine air bubbles.

Sixth Embodiment

FIG. 9 is a sectional view showing a sixth embodiment of the present invention. The same element or member as that in the first to fifth embodiment is defined by a common reference numeral or code, and its description will be omitted.

In the first to fifth embodiments, the upper cylinder 5 is provided in continuous relation to the inner cylinder 4b for the air accumulator chamber 4. The sixth embodiment is one example where the upper cylinder 5 is omitted. Air jetted from a plural of air jet nozzles 6a is injected into a surface of a target substance, and thereby finely fragmented, whereafter the fine air bubbles enter an inner cylinder 4b from therebelow, and then flow out from an opening 4d of the inner cylinder. The omission of the upper cylinder 5 makes the apparatus compact.

The invention claimed is:

1. An aeration apparatus for use under a condition that is immersed in a target substance, to inject air into the target substance so as to aerate the target substance, comprising:
    a lower cylinder having an opening formed at a lower end thereof to allow the target substance to flow thereinto, the lower cylinder being divergent upwardly from the opening;
    an air accumulator chamber formed based on a space surrounded by a ceiling portion, an outer cylinder provided above and in continuous relation to the lower cylinder, and an inner cylinder disposed inside the outer cylinder with a distance therebetween and formed to allow a lower end thereof to have a diameter greater than that of the opening of the lower cylinder, the space being hermetically closed during stop of the aeration apparatus;
    an air jet device including an air delivery pipe disposed on the ceiling portion at a position inside the air accumulator chamber, the air delivery pipe having a plurality of air jet nozzles adapted to jet air toward the target substance and arranged at intervals; and
    a compressed-air supply pipe connected to the air delivery pipe through a connecting pipe at a position outside the air accumulator chamber, to supply compressed air thereto.

2. The aeration apparatus as defined in claim 1, which further comprises an upper cylinder provided in continuous relation to the inner cylinder of the air accumulator chamber, the upper cylinder having an opening formed at an upper end thereof to allow the target substance to flow out therefrom.

3. The aeration apparatus as defined in claim 2, wherein a connection region between the upper cylinder and the inner cylinder has an annular-shaped stepped portion formed at a lower end of the upper cylinder.

4. The aeration apparatus as defined in claim 1, wherein the compressed-air supply pipe is provided with a check valve at a position adjacent to the connecting pipe of the air delivery pipe.

5. The aeration apparatus as defined in claim 1, wherein the inner cylinder of the air accumulator chamber is divergent downwardly from an upper end thereof.

6. The aeration apparatus as defined in claim 1 wherein:
    the inner cylinder of the air accumulator chamber has a circular shape in horizontal cross-section; and
    each of the air jet nozzles has an air jet angle provided to allow a jet direction of an air jet therefrom to be oriented toward the inner cylinder.

7. The aeration apparatus as defined in claim 6 wherein, the air-jet angle of each of the air jet nozzles is formed to allow the jet direction to be oriented in a tangential direction of the inner cylinder.

8. The aeration apparatus as defined in claim 1, wherein the inner cylinder has a lower edge formed with a plurality of cutouts at intervals to provide a plurality of air inlets each communicated with an inside of the inner cylinder.

* * * * *